July 4, 1944.  G. S. ALLIN  2,352,593
WHEEL EQUIPPED TRACTOR
Filed Oct. 20, 1941  4 Sheets-Sheet 1

INVENTOR
GEORGE S. ALLIN
BY
Cook & Robinson
ATTORNEY

July 4, 1944.    G. S. ALLIN    2,352,593
WHEEL EQUIPPED TRACTOR
Filed Oct. 20, 1941    4 Sheets-Sheet 2
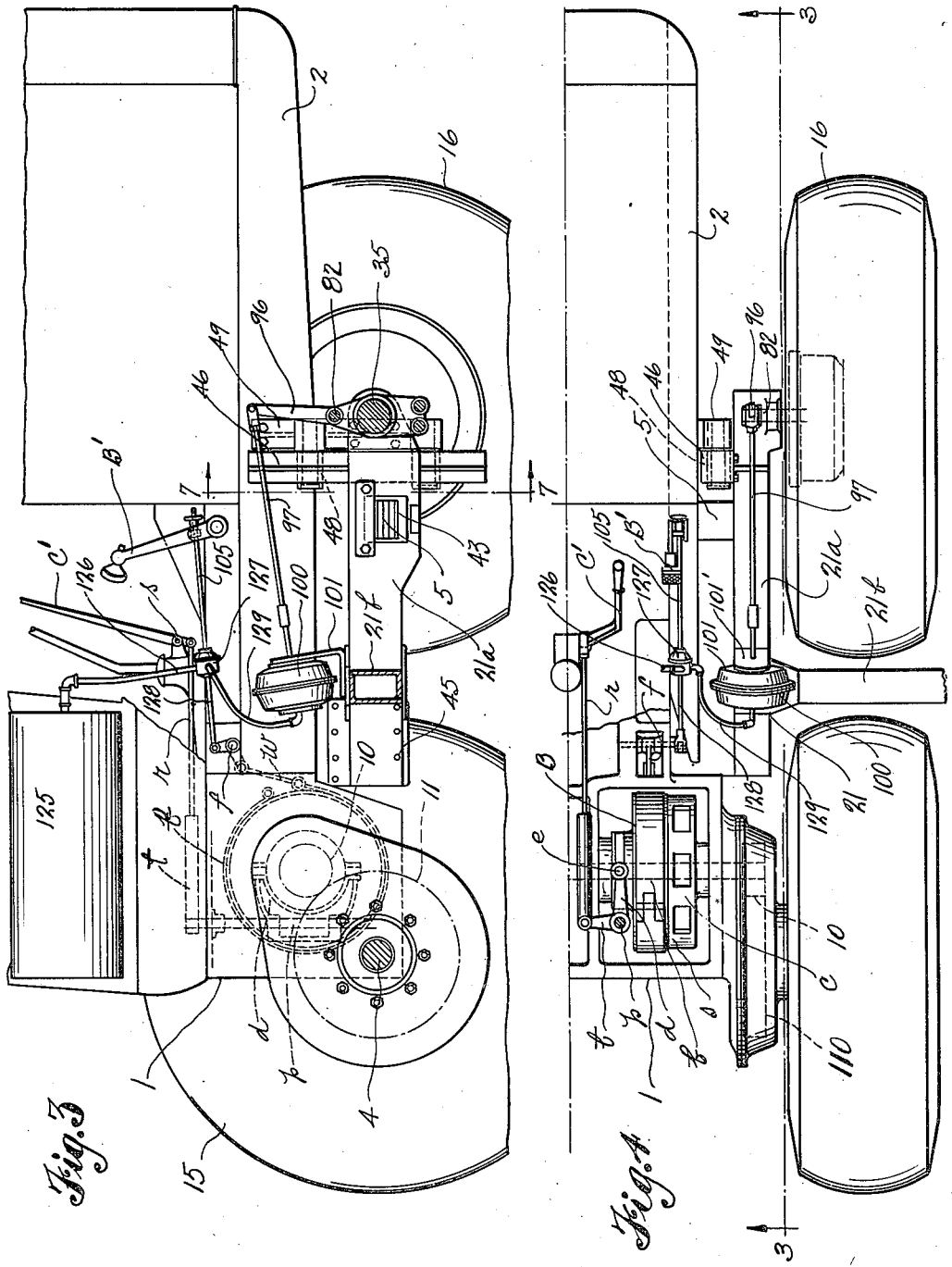
INVENTOR
GEORGE S. ALLIN
BY
Cook & Robinson
ATTORNEYS July 4, 1944.  G. S. ALLIN  2,352,593
WHEEL EQUIPPED TRACTOR
Filed Oct. 20, 1941  4 Sheets-Sheet 3
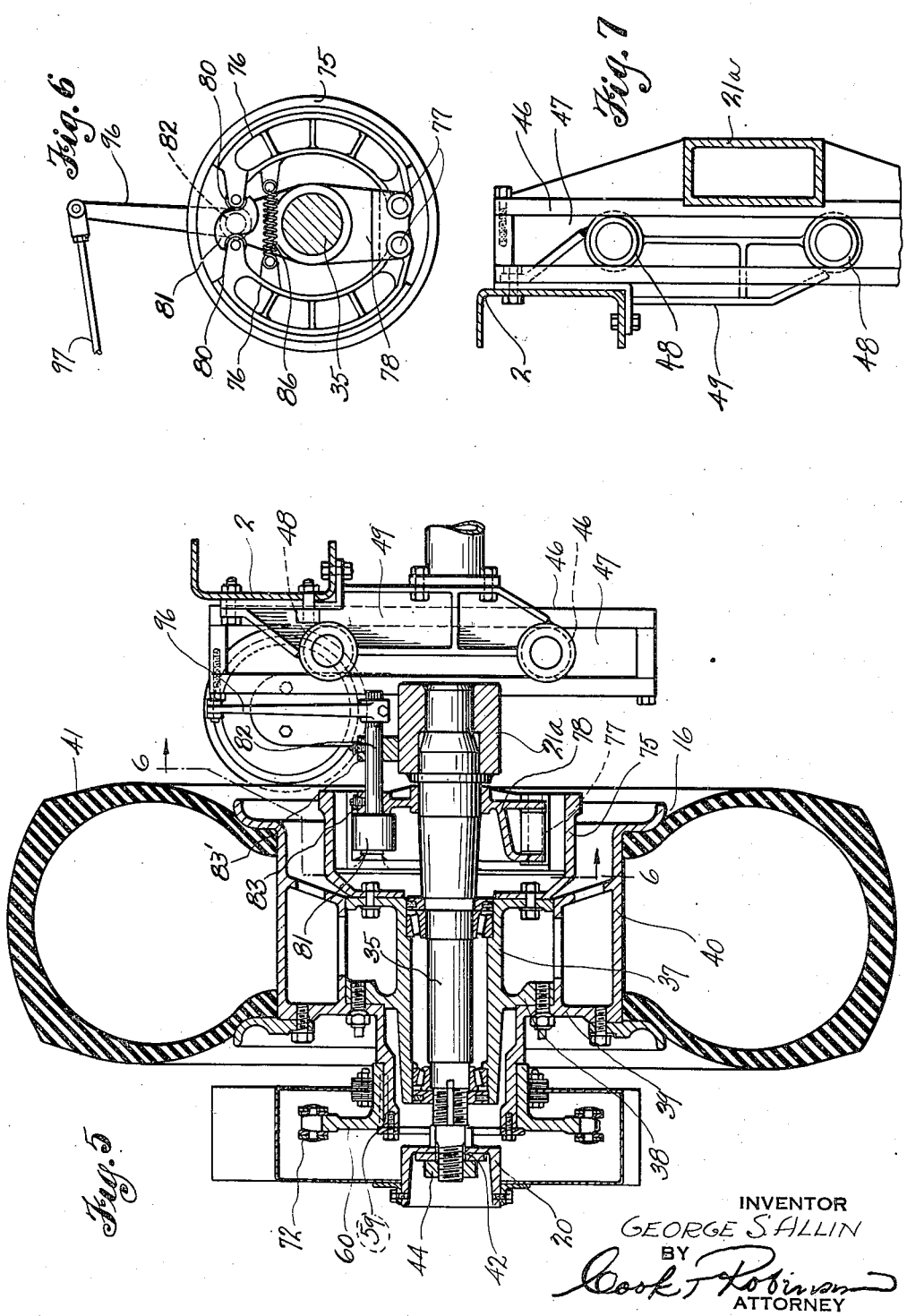
INVENTOR
GEORGE S ALLIN
BY
Cook T Robinson
ATTORNEY July 4, 1944.   G. S. ALLIN   2,352,593
WHEEL EQUIPPED TRACTOR
Filed Oct. 20, 1941   4 Sheets-Sheet 4
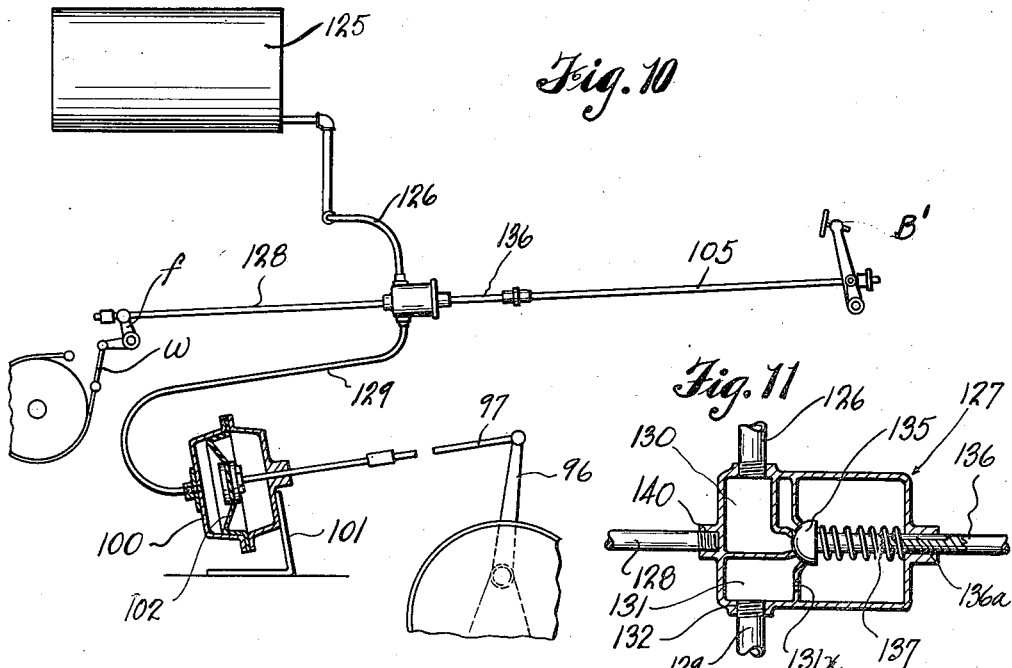
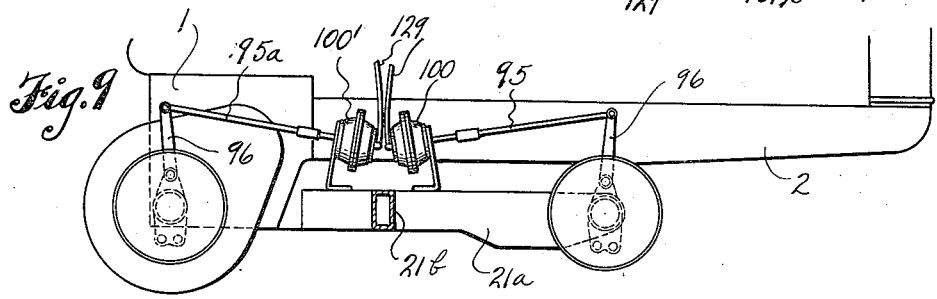
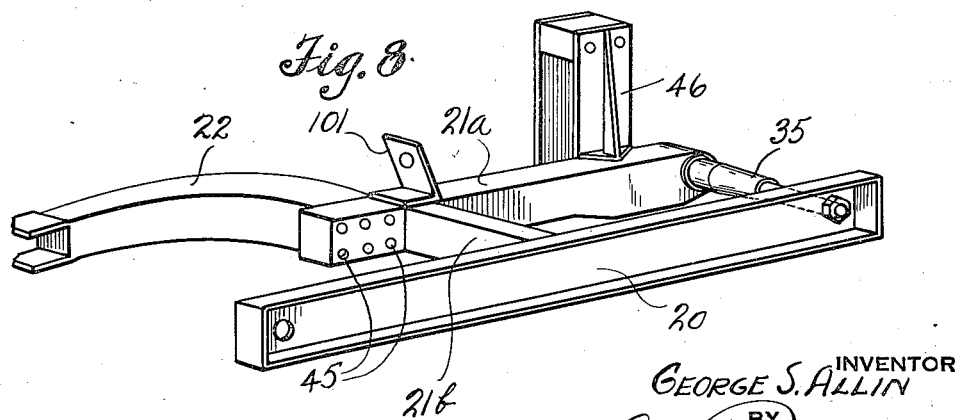
INVENTOR
GEORGE S. ALLIN
BY
Cook & Robinson
ATTORNEY Patented July 4, 1944

2,352,593

UNITED STATES PATENT OFFICE 2,352,593

WHEEL EQUIPPED TRACTOR

George S. Allin, Seattle, Wash., assignor to Isaacson Iron Works, Seattle, Wash., a corporation of Washington Application October 20, 1941, Serial No. 415,705

5 Claims. (Cl. 180—17)

This invention relates to tractors, and has reference more particularly to improvements in wheel equipped crawler track replacement units of those kinds which have been described and illustrated in my copending applications, filed under Serial Nos. 337,647 (Pat. No. 2,265,986 dated Dec. 16, 1941); 375,279 (Pat. No. 2,284,790 dated June 2, 1942); 385,261 (Pat. No. 2,310,727 dated Feb. 9, 1943), and 398,873 (Pat. No. 2,311,-922 dated Feb. 23, 1943).

In connection with the aims and purposes of the present improvements, it will be here explained that the inventions that have been described, illustrated and claimed in the above numbered applications relate to the design, application and use of novel types of wheel equipped units as replacements for the crawler tracks of well known and universally used tractors, such for example, those known by the trade names "Cle-Track," "Caterpillar," "International" and "Allis-Chalmers"; such replacements being designed to convert the tractors to which they are applied from the crawler types to wheeled types, with incident advantages of higher speed and greater utility, but without loss of maneuverability or efficiency.

As is well known in the art, tractors of those kinds above identified by their trade names, are now equipped with crawler track mounting frames at opposite sides of the tractor main frame. These track frames extend lengthwise of the main frame and are equipped with sprocket wheels, and suitable guides for mounting the crawler tracks thereon.

The crawler tracks at opposite sides of the tractor are independently driven through certain of their mounting sprockets and each may be controlled independently of the other to provide for steering the tractor.

In those kinds of crawler type tractors to which the present replacement units are made applicable according to the disclosures of the previously mentioned applications, straight ahead or straight rearward travel is accomplished by the forward or rearward driving of the tracks in unison, while turning and pivoting is effected through the differential driving of the individual crawler tracks. The differential driving is accomplished through mechanism referred to in the art as "steering clutches"; there being such a clutch provided in connection with each crawler track, and these clutches and their corresponding brakes are individually controllable from the driver's position through the proper manipulation of brake pedals and clutch control levers.

Braking of the vehicle is rarely employed except to aid in steering control, and this is accomplished through the braking facilities incorporated in, or in connection with the steering clutches.

Without going into any lengthy description of details of the various crawler track replacement units which have been illustrated and described in the above mentioned pending applications, and without reciting the various uses and advantages to be gained by use of such replacement equipment, suffice it to say that in actual test, they have surpassed all expectations in many uses and under varying conditions.

It has been disclosed, however, that because of the relatively high speeds made possible and at which the tractors are normally operated when equipped with the present wheeled units, the braking facilities as originally provided in connection with the power transmission and steering clutches is entirely inadequate, and consequently is relatively short-lived. This will be readily understood when it is remembered that ordinarily, tractors of the mentioned crawler types operate at speeds of from three to six miles per hour, whereas, with the present wheeled equipment, they are operated at speeds of from ten to twenty-five miles per hour. Thus, it is imperative to safety, adequate control and satisfactory operation that positive, more durable and more adequate braking equipment be provided than is available in the original equipment. Furthermore, it is believed to be most practical that the additional braking facilities should be applied directly to the ground wheels and not merely added to the already existing brakes of the steering clutches.

In view of the above, it has been the principal objects of this invention, first, to improve the braking facilities of tractors that have been equipped with track replacement units of the kind disclosed in my copending applications above mentioned; second, to apply braking equipment directly to the track replacement units, and, third, to so associate the additional braking means of the wheeled units with that already existing in connection with the steering clutches and power transmission facilities of the tractor that, in the conversion of the tractor from the crawler to the wheeled type, the original steering clutch braking facilities supplement those of the replacement units, particularly in their use as emergency brakes.

Still another object of this invention is to provide an improved means for the vertical guidance of the oscillating ends of the frames of the wheeled units whereby to relieve the pivot axle of twisting and lateral strains and to insure a more substantial and better construction, particularly where heavy units of large size are concerned.

Still other objects of the invention reside in the details of construction of parts, in their combination and mode of operation, as will hereinafter be fully described.

In accomplishing these and other objects of the invention, I have provided the improved details of construction, the preferred forms of which are illustrated in the accompanying drawings, wherein—

Fig. 3 is a sectional view taken in a vertical plane parallel to the tractor frame and just within the set of wheels at one side as on the line 3—3 in Fig. 4, showing the braking facilities and its control mechanism for that set of wheels.

Fig. 4 is a plan view of the same parts.

Fig. 5 is an enlarged, cross sectional view on the line 5—5 in Fig. 2.

Fig. 6 is a section, taken on the line 6—6 in Fig. 5, showing the brake shoes and their actuating cam and lever.

Fig. 7 is an enlarged, cross section on line 7—7 in Fig. 3.

Fig. 8 is a perspective view of the present swing frame.

Fig. 9 is a side view or elevation of the braking devices as applied to the unit in Fig. 8.

Fig. 10 is a diagrammatic layout of the vacuum connection and control valve at one side of the tractor.

Fig. 11 is a cross sectional detail of the vacuum applying valve mechanism as used with each wheeled unit.

Referring more in detail to the drawings—

It is to be understood that while the crawler track replacement equipment that is herein illustrated is of such design and detail as to adapt it to a tractor of a particular kind, namely, the "International" tractor, it is quite evident that by slight modification in detail, and without departing from the spirit of the invention that is herein set forth, the unit could readily be made applicable to other kinds or makes of tractors of this general type, known as "crawlers."

In the present drawings and in the following description, only such parts as are directly concerned with the present invention have been shown in detail, or will be specifically referred to; the gist of the invention residing in the provision of braking equipment for crawler track replacement units employing large, rubber tired wheels, and used in addition to and supplemented by the original steering clutches and their brakes.

Figure 2:
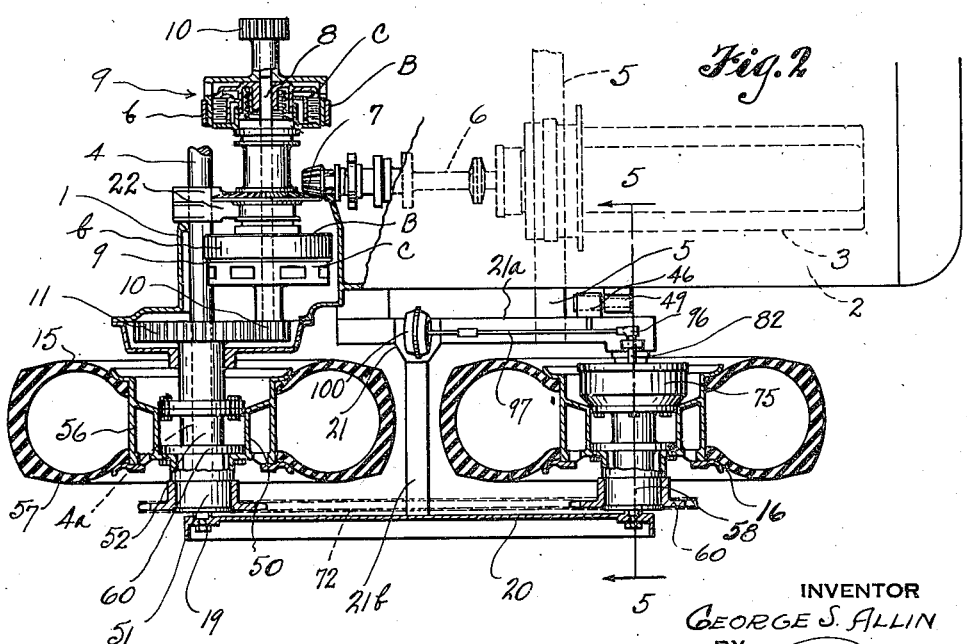
Fig. 2 is a plan view of a portion of the tractor, showing the track replacement unit at one side in horizontal sections, and illustrating the tractor driving mechanism, including the steering clutch and brake mechanism associated with that unit.

In the general construction of any one of those crawler type tractors which I have in mind in connection with use of the present improved equipment, there is a main frame structure which mounts the engine, or the prime mover, and the various tractor controls. The main frame structure, in a typical construction, includes a closed and substantially formed, rearwardly disposed housing 1, which encloses the power transmission gearing the two steering clutches and their brake mechanisms for the crawler tracks. As shown in Fig. 2, this housing is rigidly fixed to a forwardly extending frame structure comprising spaced, opposite side beams, 2, between which the engine, or prime mover 3 is supported. Extending horizontally through the housing 1 is a supporting shaft 4, of substantial diameter, which has its opposite end portions, designated by reference character 4a, extended through and beyond the opposite side walls of the housing. These extended portions of the shaft originally were intended to serve as pivot axles for mounting the track frames and also as mounting axles for the track driving sprocket wheels. This axle, in the art, is generally referred to as the "pivot axle."

Disposed transversely of the frame structure 2, substantially forwardly of the pivot axle 4, is a laminated spring 5. This spring is functionally mounted medial of its ends in a support that is pivoted in the frame structure 2. This spring is known as the equalizer spring. Opposite end portions of the spring 5 extend below and equally beyond the opposite side beams 2 of the main frame structure, and, in their normal use, engage with the vertically oscillating ends of the crawler track frames to support and cushion the forward portion of the tractor frame.

With this usual arrangement of parts, the main tractor frame is supported through the mediacy of cross shaft 4 and spring 5, and it is to these parts that the present wheeled units are applied to support the main frame in a like manner both for propulsion and steering.

The original equipment of the tractor, besides the prime mover or engine 3, includes the drive shaft 6 that extends rearwardly from the engine and is operatively connected, by suitable gearing as shown at 7 in Fig. 2, with a short, transversely supported shaft 8 which, at its ends, is operatively connected through the steering clutch mechanisms, each of which is designated in its entirety by reference numerals 9, with pinion gears 10. The gears 10 drive relatively large gear wheels 11 that are mounted to revolve upon the extended end portions 4a of the pivot axle 4 at opposite sides of the main frame.

For purpose of better understanding, it will be explained that each of the steering clutch mechanisms 9 embodies a clutch C and a brake B, to which latter a brake band $b$ is applied. The clutches 9, associated with brake mechanisms at opposite sides of the tractor, are intended to be individually controlled by the vehicle driver through the manipulation of hand levers $C^1$. Likewise, the brakes are individually controlled by manipulation of foot pedals $B^1$.

In Fig. 3, I have shown the lever $C^1$ for the mechanism at the near side of the tractor as being pivotally supported at its lower end by pivot S, and operatively connected to a rearwardly extending rod $r$ which, in turn, is connected to a lever arm $t$, fixed on a rotatable, vertical pivot shaft $p$. The shaft $p$ has another lever arm $d$ fixed thereto and this arm, in turn, has operative connection, as at $e$ in Fig. 4, with the control device of corresponding clutch C. By forward movement of the lever $C^1$, the clutch C will be released against the holding pressure of a spring, not shown, as is well understood in the art.

The brake that is associated with the clutch C comprises the drum to which brake band *b* is applied. The band *b* has an end connection, designated at *w* in Fig. 3, with a pivoted bell crank arrangement *f* which in turn has an operative connection, later described in detail, with the foot pedal B[1] through which pressure on the pedal operates to tighten the band *b* to apply braking pressure to the drum. Spring means, not shown, operates to release the brake when the pressure on the foot pedal is removed.

The present crawler track replacement equipment embodied by the invention includes, for each side of the tractor, a pair of ground wheels arranged in tandem, preferably of substantial diameter and equipped with heavy duty pneumatic tires. Each set of wheels is mounted by a swing frame structure and the wheels are of equal diameter and are disposed quite close together. In the present construction, the rear wheel 15 at each side of the tractor is adapted to be directly driven from the engine through the corresponding steering clutch mechanism, as will presently be explained, and the front wheel, 16, is driven in unison with the rear wheel by a sprocket chain belt connection as later described.

Each of the swing frames comprises, as seen in Fig. 8, a horizontally disposed, longitudinal beam 20, forming the outside member, an angle bracket 21 fixed to the beam 20, and a brace member 22 fixed to the bracket. The longitudinal beams 20 of the swing frames at the opposite sides of the main frame are operatively fixed at their rearward ends to pivot bearings 19 mounted on the outer ends of the pivot axle 4.

The beams 20 are adapted to oscillate freely at their forward ends in vertical planes, and the angle brackets 21 are fixed to the beams 20 to oscillate therewith. Each bracket 21 comprises a horizontal leg 21a that is spaced inwardly from and held rigidly parallel to the swinging end of the beam 20 by a bracket leg 21b that is disposed at a right angle to the leg portion 21a, and at its outer end is rigidly secured by suitable means to the beam 20 at approximately its medial point passing between the tandem wheels 15 and 16. In the present showing, the beam 20 is of channel form, while the leg 21a of the bracket 21 is fabricated from two angle irons placed edge to edge to form a hollow tube, as noted in Fig. 7. At its outer end, the arm 21a has a solid casting fitted and secured therein and provided for mounting the equalizer spring, as later described.

The leg 21a terminates at its forward end approximately even with the forward end of the beam 20 and mounts a spindle 35 on which the forward ground wheel 16 of the unit is revolubly mounted. The wheel 16 has a hub portion 37 revoluble on the spindle and the hub is equipped with an outer end flange 38 that mounts a wheel body disk 39, equipped with a rim 40 carrying a pneumatic tire 41; these parts being best shown in Fig. 5. The outer end of the spindle extends through a hole 42 in the forward end of the beam 20, and is secured by the application of a nut 44 to a threaded outer end portion of the spindle.

To give lateral rigidity to the swing frame structure, the brace bar 22 is fixed solidly to the rearward end portion of the bracket 21 as by the bolts 45, and extends therefrom in an inwardly and rearwardly curved direction, and at its end is pivotally mounted on the pivot axle 4 at a point close to the longitudinal axial center of the tractor, as will be understood by reference to Figs. 2 and 4.

Formed through the forward end portion of the arm 21a is a socket, or seat 43 within which an end portion of the equalizer spring 5 engages to yieldingly support the forward end of the vehicle. Also fixed rigidly to the forward end portion of the bracket arm 21a is a guide 46 formed with a vertically extending slot 47 wherein the two vertically spaced rollers 48—48, carried by a bracket 49 that is rigidly bolted to the adjacent side beam 2 of the main frame, are contained to guide and hold the swing frame against outward or inward displacement relative to the main frame, but without interfering with its intended oscillating action in a vertical direction. The slot 47 in this case is substantially longer than the distance of vertical spacing of the rollers so as not to interfere with the action.

The rear ground wheel 15 of each set is mounted to rotate freely on the extended end portion 4a of pivot shaft 4. Each wheel 15, as shown, is of the same size and character of construction of the front wheel 16. The rear wheel comprises a body disk 50 that is bolted to the outer end flange 51 of a hub member 52 revoluble about the shaft end 4a. The hub member, in turn, is fixed at its inner end coaxially to the corresponding gear 11 to turn therewith. The body disk 50 carries a tire mounting rim 56 and this mounts a pneumatic tire 57.

As noted best in Fig. 2, the body disks of the two wheels are formed with outwardly extending hub-like portions 58, and applied thereto, and keyed thereon, as at 59 in Fig. 5, are sprocket wheels 60 about which, for each tandem set of wheels, a chain belt 72 operates as a means of causing the wheels to rotate in unison, both being positively driven and rendered effective for traction in driving or in braking.

The gist of the present invention resides in the provision of more adequate and more effective braking facilities than is possible to obtain through the original steering clutch brakes. It will be observed in Figs. 2 and 5, that the front wheel hub has a brake drum 75 bolted thereto at its inner end, and that internally of the drum, a pair of expanding brake shoes 76 are operatively located. These shoes are pivotally supported at their lower ends, as noted in Fig. 6, by pivot bolts 77 mounted in a bracket 78 that is fixed about the inner end portion of the spindle 35. At their upper or swinging ends, the brake shoes are formed with opposed cam rollers 80 between which a cam 81 is located. The cam 81 is fixed on a cam shaft 82 rotatably mounted in alined bearings 83—83', on the bracket 78 and arm 21 of the swing frame structure, and adapted to be rotatably actuated to effect rotation of the cam and the expanding of the shoes against the drum. A coiled spring 86 connecting at its ends to the oscillating ends of the brake shoes, operates to draw them toward each other to disengage the drum and release the braking action. The cam shaft 82 is equipped with a vertically extending lever arm 96 to which a connecting rod 97 is attached. The rod 97 extends rearwardly to a "vacuum booster" cylinder designated in its entirety by reference numeral 100. This booster comprises an air-tight drum, 101, fixedly mounted on the swing frame bracket 21 by a support 101'. The drum is divided by a flexible diaphragm 102 to which the end of rod 97 is fixed. It will be understood that if vacuum is applied to the drum at one side of the diaphragm, the diaphragm will be deflected accordingly, and thus a pull can be exerted on the rod 97 to apply the brakes in accordance with the extent of vacuum applied.

It is to be understood also that the braking facilities at opposite sides of the tractor are alike, both in construction and mode of operation, and that the equipment illustrated in Figs. 3 and 4, which controls the braking mechanisms at the near side, would be duplicated at the opposite side.

In the arrangement of parts illustrated in Figs. 2 and 3, it will be observed that the brake pedal B¹ is pivotally mounted at its lower end, and that a connecting rod 105 extends rearwardly from an operative connection with the pedal, and this operates through connections indicated at *f* in Fig. 3, to control the braking of the steering clutch mechanism 9.

The connection between the foot pedal and clutch, besides the rod 105, includes a valve housing 127 and a rod 128 that extends from the housing to the lever *f*, later more fully described.

In the present improved arrangement of braking facilities, a vacuum tank 125 is mounted on the tractor at any suitable location and vacuum is drawn and maintained therein by a pump, not shown. This pump might well be operated through a connection with the engine 3. A vacuum connection, including a flexible conduit 126 leads from the tank 125 to the control valve housing 127 that is interposed in the braking connection between foot pedal B¹ and lever *f*, and from this housing 127, a flexible conduit 129 leads to the drum of vacuum booster 100.

Now referring to the enlarged cross sectional view of the valve housing 127, as shown in Fig. 11, it will be observed that the vacuum line 126 opens to a chamber 130 in the housing, and that the chamber 130 is surrounded by a chamber 131 with a lateral outlet 132 from which the conduit 129 leads to the booster cylinder 100. The chambers 130 and 131 have an intercommunicating passage normally closed by a valve 135 on a rod 136 that extends from the housing in a forward direction. A coiled spring 137 surrounds the rod within the housing and bears against the valve to yieldingly hold it seated.

The housing 127 has a socket 140 at one end within which one end of the rod 128 is fixed; the other end of the rod being operatively attached to the braking mechanism *f*. The forward end of the valve rod 136 connects rigidly with the brake rod 105 as a continuation thereof, and this, in turn, has a pivotal connection at its forward end with the foot pedal B¹.

A requirement for the intended operation of the brakes is that the holding tension of the coiled spring 137 be less than the releasing tension of the steering clutch mechanism 9 so that when the foot pedal is depressed, the valve 135 will be moved to its open position prior to any actuation of the transmission brake 9. The unseating of valve 135 provides for communication of the vacuum through the valve housing to the booster drum, and this, through the connections shown, effects the application of braking force to the front wheel of the unit. Then, by a continued forward actuation of the foot pedal, sufficient to take up all the lost motion afforded in the spring 137, finally results in the functional operation of the braking facilities of the steering clutch mechanism 9. The rod 128 might well have a limited sliding connection with lever *f* so that its braking action becomes effective only after the full effect of the vacuum brake has been used.

The valve mechanism contained in housing 127 is such that upon seating of the valve 135, the vacuum in the chamber 131 will be broken to permit release of the brake. This might be accomplished in various ways; for example, through a passage 136a in the rod 136 which becomes closed when rod 126 is moved to unseat the valve 135, and a port 131x in the inside wall of chamber 131.

By means of the facilities described, it is possible to effectively and properly control the braking of the vehicle for all ordinary operations through the wheeled units. This braking may accomplish the quick stopping as well as the steering of the vehicle and is all that is required for normal operations. However, the steering clutch brakes are always available and can be used for unusual situations as emergency brakes.

In Fig. 9, I have illustrated the application of brakes for both wheels of each unit. In such cases of use, two booster drums 100—100' are employed at each side of the tractor, and each wheel is equipped with brake drum and shoes corresponding to those shown in Fig. 5. From the drums, rods 95 and 95a extend to the cam levers 96 of the front and rear wheels respectively, and conduits lead from the valve housing at that side to both booster drums. Thus, when an application of braking force is made, it opens the vacuum valve to admit vacuum to both drums in like amount.

Figure 1:
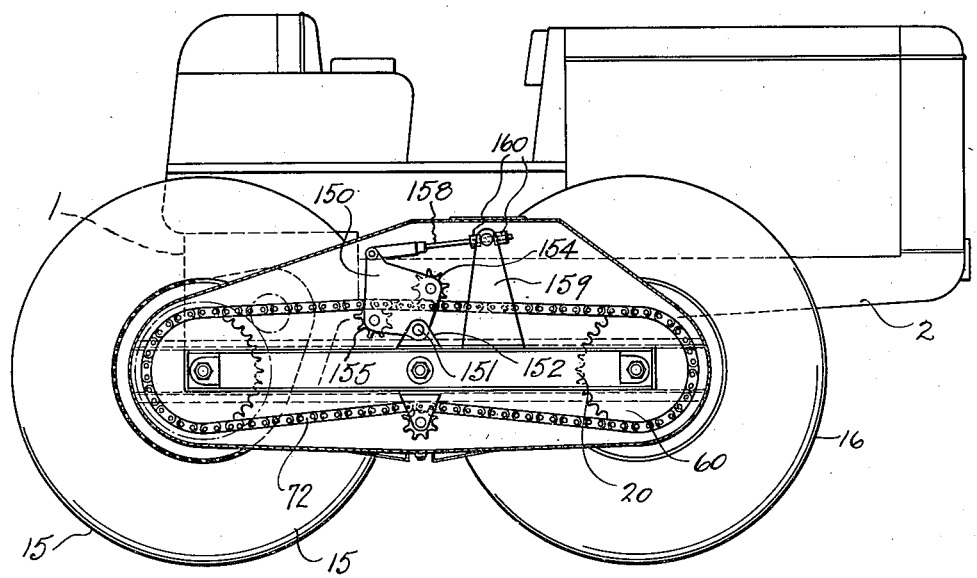
Fig. 1 is a side view of a tractor equiped with wheeled track replacement units embodying the braking facilities and other features of the present invention.

As a detail of this construction, each unit is equipped with a sprocket chain tightening means, as shown best in Fig. 1. Each tightener comprises a plate 150 disposed vertically along the side of the upper run of the chain belt 72, pivotally mounted at its lower edge by bolt 151 in a bracket 152 carried by beam 20. On the plate, sprocket wheels 154 and 155 are mounted to engage with the chain belt at top and lower sides and at an interval spaced along the belt. The top edge of the plate is connected by a link 158 with a bracket 159 that is fixed to the beam 20, and the link is equipped with adjusting nuts as at 160 whereby its effective length may be varied as required to place more or less tension on the belt.

Having thus described my invention, what I claim as new therein and desire to secure by Letters Patent is:

1. In a tractor having a main frame, traction units at opposite sides of the main frame for its support, a prime mover mounted by the main frame, driving connections between the prime mover and the traction units, each connection including a steering clutch and brake, individual braking means applied directly to the traction units, and a brake applying means common to the steering clutch brake and traction unit braking means at the same side of the main frame and operable to effect their energization in sequence.

2. A tractor of the character described comprising a main frame, swing frames supporting the main frame at opposite sides thereof and adapted for independent oscillation, ground wheels mounted by each swing frame, a prime mover mounted by the main frame having separate driving connections with the ground wheels of different swing frames; each connection including a steering clutch and brake, wheel braking means applied directly to the ground wheels of each swing frame, an energizing means therefor on the corresponding swing frame and a brake control means on the main frame common to the steering clutch brake and wheel braking means at the same side of the tractor.

3. A tractor of the character described comprising a main frame, swing frames supporting the main frame at opposite sides thereof and mounted for independent oscillation, ground wheels mounted by each swing frame, a prime mover mounted by the main frame having separate connections with the ground wheels of the different swing frame; each driving connection including steering brake mechanism, braking means applied directly to the ground wheels at opposite sides of the tractor, and a manually controlled brake applying means, common to the steering brake mechanism and wheel braking means at the same side of the tractor, movable through an initial interval for actuation of the wheel braking means and through an additional interval to actuate the steering brake mechanism.

4. A tractor as recited in claim 3 wherein means is associated with each of the steering brake mechanisms to yieldingly resist its application, and wherein said brake applying means includes a brake rod connection with the steering brake mechanism; said brake rod having a yieldable, lost motion joint therein, and wherein means is operable incident to the initial brake applying movement of the brake rod, for effecting an application of braking force to the ground wheels, and other means is operable, after lost motion in the joint has been overcome by the initial braking action, to effect the application of the steering brake mechanism.

5. In a tractor having traction units at opposite sides thereof, a prime mover with driving connections extended to the traction units and including a steering clutch and brake mechanism in each driving connection; a braking means for each traction unit independent of the steering clutch brake and including a fluid pressure medium booster connected to actuate the braking means, a source of fluid pressure medium having connection with the booster, a control valve in the connection and a manually operable brake control means movable through an initial interval to open the valve to apply the pressure medium to the booster for actuating the unit brake and movable through an additional interval to apply the corresponding steering clutch brake.

GEORGE S. ALLIN.